United States Patent [19]
Yamano et al.

[11] Patent Number: 5,947,375
[45] Date of Patent: Sep. 7, 1999

[54] LIQUID HEATING AND CIRCULATING APPARATUS FOR USE IN AN AUTOMOTIVE VEHICLE

[75] Inventors: Susumu Yamano, Kusatsu; Norio Yoshida, Moriyama; Teruo Nakagawa, Kusatsu; Minoru Fukumoto, Nara, all of Japan

[73] Assignee: Matsushita Electric Industrial Co., Ltd., Osaka, Japan

[21] Appl. No.: 08/869,966

[22] Filed: Jun. 5, 1997

[30] Foreign Application Priority Data

Jul. 22, 1996 [JP] Japan ................................. 8-191894

[51] Int. Cl.⁶ .................................................. B66H 1/02
[52] U.S. Cl. ................................ 237/12.3 B; 237/12.3 R
[58] Field of Search ........................ 237/12.3 B, 12.3 R, 237/12.4, 33, 66

[56] References Cited

U.S. PATENT DOCUMENTS

| | | | |
|---|---|---|---|
| 1,486,480 | 3/1924 | Brest | 126/350 A |
| 1,684,157 | 9/1928 | Sterling | 219/208 |
| 1,773,338 | 8/1930 | Baughman | 219/208 |
| 2,086,441 | 7/1937 | Rushmore | 123/41.27 |
| 2,354,345 | 7/1944 | Wintergreen | 237/12.3 B |
| 2,474,987 | 7/1949 | Runbaken | 219/208 |
| 4,662,317 | 5/1987 | Ogawa | 123/41.21 |
| 4,677,942 | 7/1987 | Hayashi | 123/41.21 |
| 4,677,943 | 7/1987 | Skinner | 123/41.27 |
| 4,995,452 | 2/1991 | Franck et al. | 165/119 |

FOREIGN PATENT DOCUMENTS 530009  1/1921  France .............................. 126/350 B

*Primary Examiner*—Henry Bennett
*Assistant Examiner*—Derek Boles
*Attorney, Agent, or Firm*—Wenderoth, Lind & Ponack, L.L.P.

[57] ABSTRACT

An automotive vehicle such as, for example, an electric car is provided with a liquid heating and circulating apparatus for heating the interior of the vehicle body. The liquid heating and circulating apparatus is provided with a main tank containing liquid, a heater mounted in the main tank for heating the liquid, and a pump for circulating the liquid heated by the heater. The liquid heating and circulating apparatus is also provided with a water supply unit connected to the main tank and accommodating a pressure relief valve assembly, and an auxiliary tank connected to the water supply unit. The pressure relief valve assembly is operated according to predetermined pressures within the main tank to place the main tank in communication with the auxiliary tank.

6 Claims, 2 Drawing Sheets

LIQUID HEATING AND CIRCULATING APPARATUS FOR USE IN AN AUTOMOTIVE VEHICLE

BACKGROUND OF THE INVENTION

1. Field of the Invention

The present invention relates to a liquid heating and circulating apparatus mounted in, for example, an electric car for heating and circulating liquid to heat a passenger compartment defined therein.

2. Description of Related Art

FIG. 2 depicts a conventional liquid heating and circulating apparatus mounted in an electric car. The liquid heating and circulating apparatus shown therein comprises a hot water generating unit 104 and an interior heat exchanger 105 connected to the hot water generating unit 104 via a plurality of pipes or tubes 106 so that a passenger compartment defined in the car may be heated by circulating the hot water. The hot water generating unit 104 comprises a main tank 102 having a heater 101 mounted therein for heating water contained therein, and a pump 103 juxtaposed with the main tank 102 for pumping and circulating hot water generated in the main tank 102. An auxiliary tank 107 is secured to the main tank 102 on an upper portion thereof so as to communicate therewith. The auxiliary tank 107 has a lid 107a mounted thereon through which water is supplemented to the hot water generating unit 104.

In the liquid heating and circulating apparatus of the above-described construction, however, the vapor pressure of the hot water circulating therein changes according to temperature changes of the hot water, resulting in a change in water level. Because of this, the main tank 102 is required to have the auxiliary tank 107 with the lid 107a directly mounted on the upper portion thereof, as described above. This construction has a problem in that the hot water generating unit 104 is restricted in its installation or layout.

The liquid heating and circulating apparatus is generally provided with a temperature switch (not shown) or the like for controlling the water temperature to a predetermined value. However, if such a water temperature control is out of order for some reason or other and the heater 101 is kept on, the hot water will boil and become vaporized and, hence, there is a good chance that the vaporized water may escape through the lid 107a and the auxiliary tank 107 may be emptied.

SUMMARY OF THE INVENTION

The present invention has been developed to overcome the above-described disadvantages.

It is accordingly an objective of the present invention to provide an improved liquid heating and circulating apparatus for an automotive vehicle wherein the installation of an auxiliary tank required for absorbing water level changes is not restrictively located at an upper portion of a hot water generating unit, thus facilitating the installation of the liquid heating and circulating apparatus on the automotive vehicle.

Another objective of the present invention is to provide the liquid heating and circulating apparatus of the above-described type which has a simple construction and can be readily manufactured at a low cost.

In accomplishing the above and other objectives, the liquid heating and circulating apparatus according to the present invention comprises a main tank containing liquid, a heater mounted in the main tank for heating the liquid, a pump for circulating the liquid heated by the heater, a water supply unit connected to the main tank, a pressure relief means accommodated in the water supply unit, and an auxiliary tank connected to the water supply unit. The pressure relief means is operated according to predetermined pressures within the main tank to place the main tank in communication with the auxiliary tank.

By the above-described construction, even if the liquid level in the main tank rises above a predetermined level due to, for example, a temperature rise in the main tank, the pressure relief means is operated to introduce the liquid within the main tank into the auxiliary tank. On the other hand, if the liquid temperature in the main tank decreases below a predetermined value, the pressure relief means is also operated to supplement the main tank with the liquid within the auxiliary tank. The provision of the water supply unit enables the auxiliary tank to be installed on an arbitrary portion of the vehicle body, thus facilitating the installation of the liquid heating and circulating apparatus.

Advantageously, the main tank and the water supply unit are separate components but are connected to each other via a flexible connecting tube.

Again advantageously, the main tank and the auxiliary tank are separate components but have respective fittings formed thereon whereby the main tank and the auxiliary tank can be integrated together.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on an application No. 8-191894 filed in Japan, the content of which is incorporated hereinto by reference.

Figure 1:
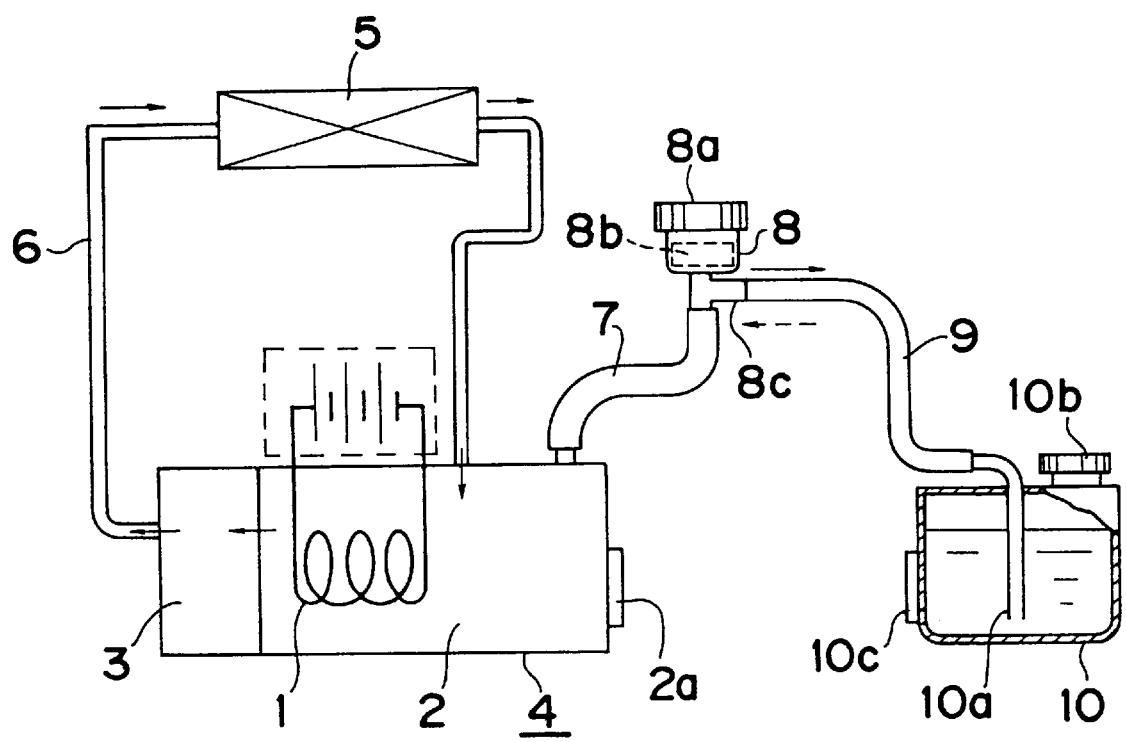
FIG. 1 is a schematic view of a liquid heating and circulating apparatus for an automotive vehicle embodying the present invention.

FIG. 1 depicts a liquid heating and circulating apparatus for an electric car embodying the present invention. The liquid heating and circulating apparatus shown therein comprises a hot water generating unit 4 and an interior heat exchanger 5 connected to the hot water generating unit 4 via a plurality of pipes or tubes 6 so that the interior of the car may be heated by circulating the hot water in a direction shown by arrows. The hot water generating unit 4 comprises a main tank 2 filled with liquid such as, for example, anti-freeze, a heater 1 mounted in the main tank 2, and a pump 3 juxtaposed with the main tank 2 for pumping and circulating liquid (hot water) heated by the heater 1. The main tank 2 is connected at, for example, an upper portion thereof to a water supply unit 8 via a connecting tube 7 such as a flexible rubber hose or the like. The water supply unit 8 has a lid 8a mounted on an upper portion thereof, a pressure relief valve assembly 8b accommodated therein, and a pressure regulating port 8c formed thereon. The pressure relief valve assembly 8b is of a known construction and includes a positive pressure regulating valve, which opens and closes at predetermined positive pressures in the main tank 2, and a negative pressure regulating valve which opens and closes at predetermined negative pressures in the main tank 2. The pressure regulating port 8c is connected to one end of a connecting tube 9 such as a flexible rubber hose, the other end of which is connected to a water guide pipe 10a. The water guide pipe 10a extends downwardly through an upper wall of an auxiliary tank 10 and terminates in the proximity of a bottom wall of the auxiliary tank 10. The auxiliary tank 10 has a lid 10b through which water is supplemented thereto. The main tank 2 has a fitting 2a formed on a side wall thereof, while the auxiliary tank 10 similarly has a fitting 10c formed on a side wall thereof. The main tank 2 and the auxiliary tank 10 can be integrated together by engaging those fittings 2a and 10c with each other, while the water supply unit 8 can be mounted on the vehicle body via a bracket.

In the above-described construction, when the hot water circulates between the hot water generating unit 4 and the interior heat exchanger 5, and if the temperature of the hot water increases excessively for some reason, the liquid level inside the main tank 2 will rise above a predetermined level. In such a case, the internal pressure of the water supply unit 8 will increase above a predetermined value, and the positive pressure regulating valve of the pressure relief valve assembly 8b will operate to introduce the overflowing liquid into the auxiliary tank 10. In contrast, if the liquid temperature in the main tank 2 decreases below a predetermined value, a pressure difference between the main tank 2 (negative pressure) and the auxiliary tank 10 (atmospheric pressure) will operate the negative pressure regulating valve of the pressure relief valve assembly 8b to supplement the liquid within the auxiliary tank 10 by introducing liquid into the main tank 2.

Furthermore, because each of the water supply unit 8 and the auxiliary tank 10 is a component separate from the main tank 2, not only can the former be installed separately from the latter, but the former can also be combined or integrated with the latter by engaging the fittings 2a and 10c with each other. As a result, the water supply unit 8 or the auxiliary tank 10 can be installed on an arbitrary portion inside the car, making it possible to readily install the liquid heating and circulating apparatus.

It is to be noted here that although the above-described embodiment has been discussed taking the case of an electric car, the present invention is equally applicable to an electrically- and engine-driven hybrid car.

Figure 2:
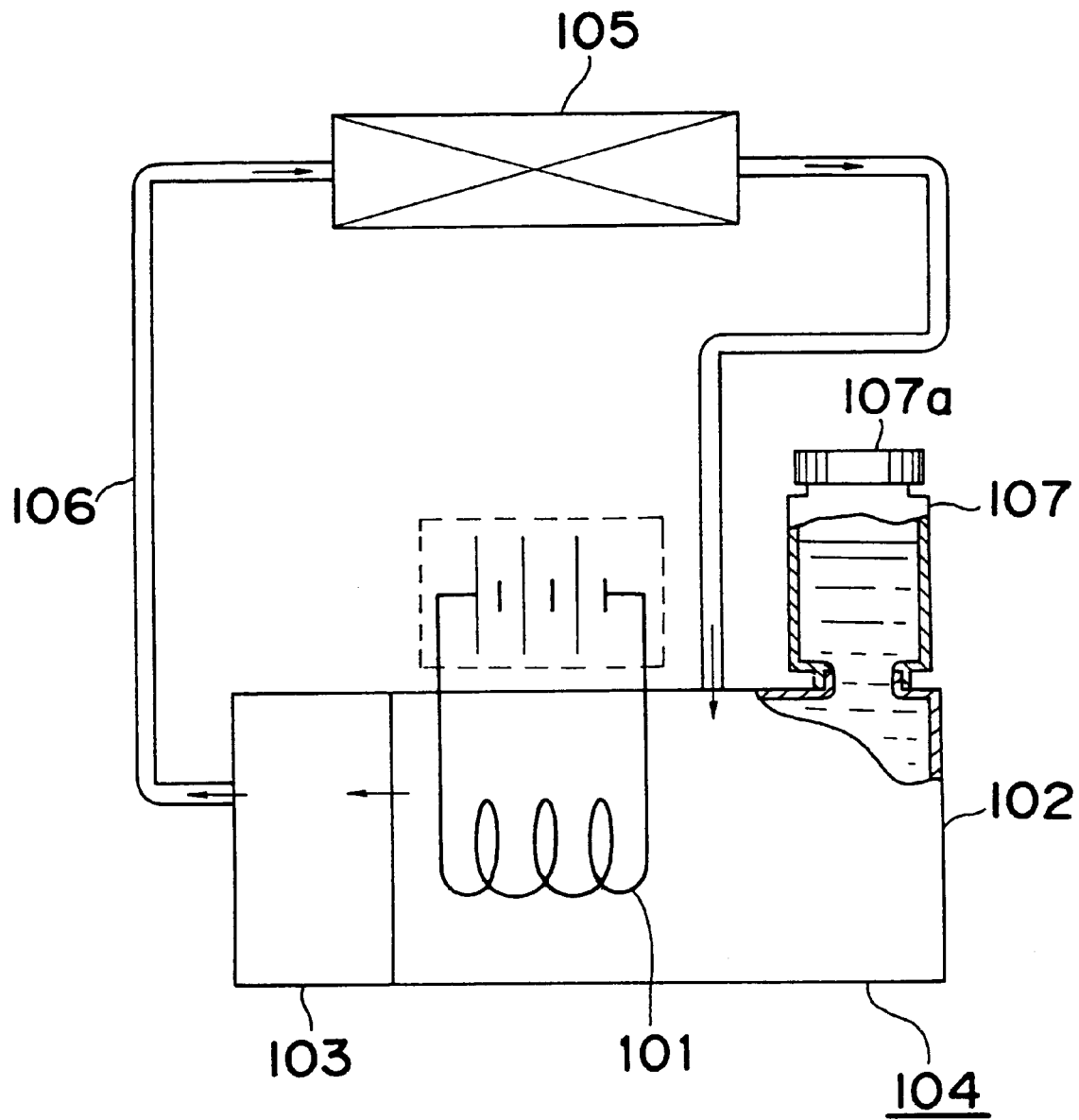
FIG. 2 is a schematic view of a conventional liquid heating and circulating apparatus for an electric car.

As is clear from the above, because the liquid heating and circulating apparatus of the present invention includes a main tank, a water supply unit accommodating a pressure relief valve assembly, and an auxiliary tank, all of which are separate components but are connected to one another via a plurality of connecting tubes, the overall height of a hot water generating unit is smaller than that shown in FIG. 2 depicting a conventional liquid heating and circulating apparatus. Accordingly, it is easy to install the liquid heating and circulating apparatus on the vehicle body.

Moreover, because the water supply unit is connected to the main and auxiliary tanks via the connecting tubes, the water supply unit can be installed at any arbitrary position where water is conveniently supplied. Also, because the main and auxiliary tanks can be integrated together by engaging respective fittings formed thereon, the liquid heating and circulating apparatus can be compact.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A liquid heating and circulating apparatus for use in a liquid circuit located in an automotive vehicle, said liquid heating and circulating apparatus comprising:

a main liquid tank;

a heater mounted in said main liquid tank;

a liquid circulation pump operably connected to said main liquid tank for use in circulating liquid through the liquid circuit;

an auxiliary tank fluidically connected to said main liquid tank;

a liquid supply unit fluidically connected between said main liquid tank and said auxiliary tank; and a pressure relief device operably provided in said liquid supply unit to normally block communication between said main liquid tank and said auxiliary tank and to establish communication between said main liquid tank and said auxiliary tank according to predetermined pressures within said main liquid tank;

wherein said main liquid tank and said auxiliary tanks are separate components;

wherein said main liquid tank has a fitting located thereon; and wherein said auxiliary tank has a fitting located thereon engageable with said fitting of said main liquid tank so as to join said main liquid tank to said auxiliary tank, thus forming a single integral component.

2. The liquid heating and circulating apparatus of claim 1, further comprising:

a flexible tube connecting said main liquid tank and said auxiliary tank.

3. The liquid heating and circulating apparatus of claim 2, wherein:

said main liquid tank has a fitting located thereon; and said auxiliary tank has a fitting located thereon engageable with said fitting of said main liquid tank so as to join said main liquid tank to said auxiliary tank, thus forming a single integral component.

4. The liquid heating and circulating apparatus of claim 1, wherein:

said pressure relief device is operable to allow flow from said main liquid tank to said auxiliary tank when a pressure within said main tank exceeds a predetermined level; and said pressure relief device is operable to allow flow from said auxiliary tank to said main liquid tank when a pressure within said main tank decreases below a predetermined level.

5. The liquid heating and circulating apparatus of claim 1, wherein:

said fitting of said main liquid tank and said fitting of said auxiliary tank are located on said main liquid tank and said auxiliary tank, respectively, such that upon engagement of said fittings an imaginary horizontal plane intersects both said main liquid tank and said auxiliary tank.

6. A liquid heating and circulating apparatus for use in a liquid circuit which is located in an automotive vehicle and which is arranged to heat a passenger compartment of the automotive vehicle, said liquid heating and circulating apparatus comprising:

a main liquid tank;

a heater mounted in said main liquid tank;

a liquid circulation pump operably connected to said main liquid tank for use in circulating liquid through the liquid circuit;

an auxiliary tank fluidically connected to said main liquid tank;

a liquid supply unit fluidically connected between said main liquid tank and said auxiliary tank; and a pressure relief device operably provided in said liquid supply unit to normally block communication between said main liquid tank and said auxiliary tank and to establish communication between said main liquid tank and said auxiliary tank according to predetermined pressures within said main liquid tank;

wherein said main liquid tank is separable from and engageable with said auxiliary liquid tank such that upon engagement an imaginary horizontal plane intersects both said main liquid tank and said auxiliary tank.

* * * * *